US006995481B2

(12) United States Patent
Gibson

(10) Patent No.: US 6,995,481 B2
(45) Date of Patent: Feb. 7, 2006

(54) ENERGY SAVING ELECTRICAL POWER CONTROL DEVICE AND METHOD

(75) Inventor: J. Alan Gibson, Richmond Hill (CA)

(73) Assignee: Sinetek Inc., Richmond Hill (CA)

(*) Notice: Subject to any disclaimer, the term of this patent is extended or adjusted under 35 U.S.C. 154(b) by 9 days.

(21) Appl. No.: 10/819,216

(22) Filed: Apr. 7, 2004

(65) Prior Publication Data

US 2004/0208022 A1 Oct. 21, 2004

(30) Foreign Application Priority Data

Apr. 9, 2003 (CA) .................................... 2424923

(51) Int. Cl.
*H01H 31/34* (2006.01)

(52) U.S. Cl. .................... 307/96; 315/209 R; 315/225; 315/226

(58) Field of Classification Search .................. 307/96; 315/209 R, 225, 226
See application file for complete search history.

(56) References Cited

U.S. PATENT DOCUMENTS

| | | | | |
|---|---|---|---|---|
| 4,350,935 A | | 9/1982 | Spira et al. | |
| 5,410,221 A | * | 4/1995 | Mattas et al. ............... | 315/307 |
| 5,455,491 A | | 10/1995 | Hajagos et al. | |
| 6,525,490 B1 | | 2/2003 | Rinaldi | |

FOREIGN PATENT DOCUMENTS

| | | |
|---|---|---|
| CA | 1089013 | 11/1980 |
| CA | 2159538 | 3/1997 |
| WO | WO 99/38248 A1 | 7/1999 |
| WO | WO 01/45242 A1 | 6/2001 |

OTHER PUBLICATIONS

Enjeti P.N. et al.: "An Approach to Realize Higher Power PWM AC Controller", Proceedings of the Annual Applied Power Electronics Conference and Exposition, Mar./93, p 323-327.

* cited by examiner

*Primary Examiner*—Shawn Riley
(74) *Attorney, Agent, or Firm*—Dimock Stratton LLP; Mark B. Eisen

(57) ABSTRACT

An electrical load power control device is described that reduces the power consumption of inductive and inductive-dissipative loads, including for example fluorescent lighting. The power circuit of the invention interrupts AC power supply to the load during a plurality of intervals within each half cycle of the AC mains signal frequency whilst providing an alternate path for current flow during the interruption to maintain a sinusoidal-like current to the load. During a crossover lag zone encompassing zero crossing points of the voltage and current and during which the voltage and current have opposite polarities, both elements of the power switch are switched to the "on" condition, one element of the circulating switch is switched to the "on" condition when a positive current is flowing in the load and the other element of the circulating switch is switched to the "on" condition when a negative current is flowing in the load. The power factor presented by the load and other current parameters of the load such as form factor and total harmonic distortion may be desirably modified. In the preferred embodiment an oscillator has a duty cycle control circuit which deactivates the power switch during a predetermined portion of the oscillator duty cycle. The duty cycle establishes the amount of power reduction.

21 Claims, 6 Drawing Sheets

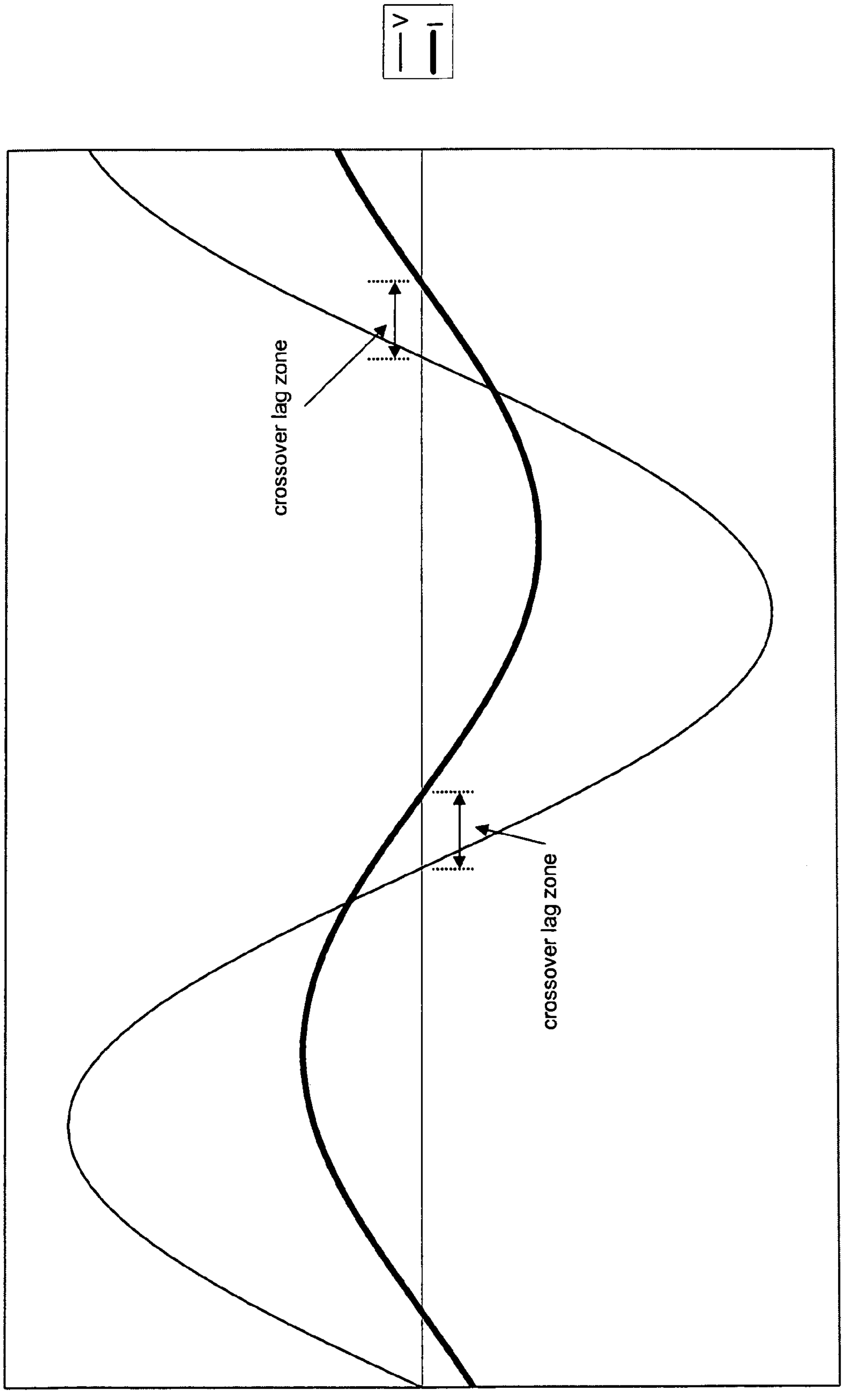
Fig. 1 Voltage & Current Waves

Switched Voltage & Current Waves

Fig. 2B Expanded Voltage & Current Waves
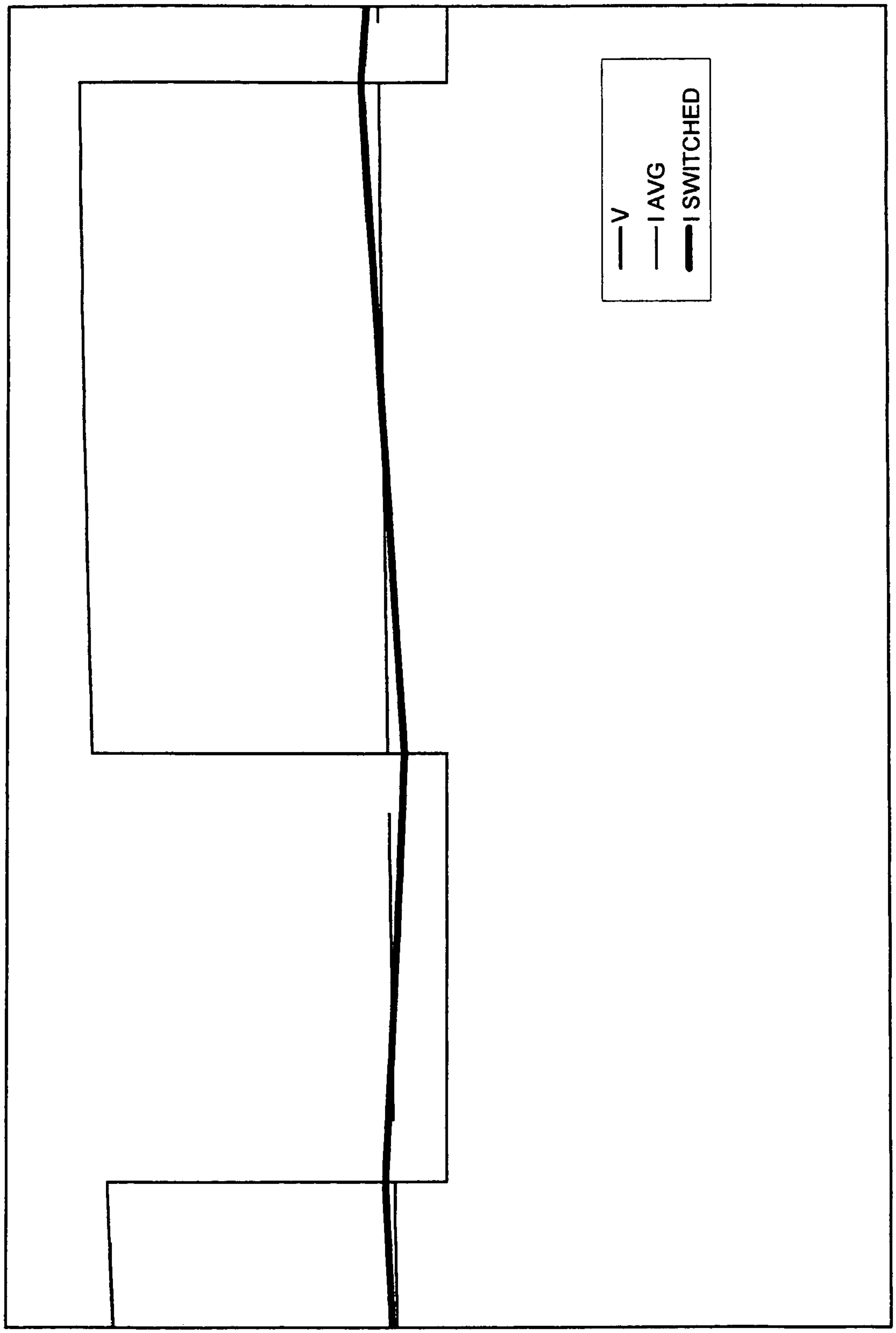

FIG4B Logic Timing Relative to Voltage & Current Waves
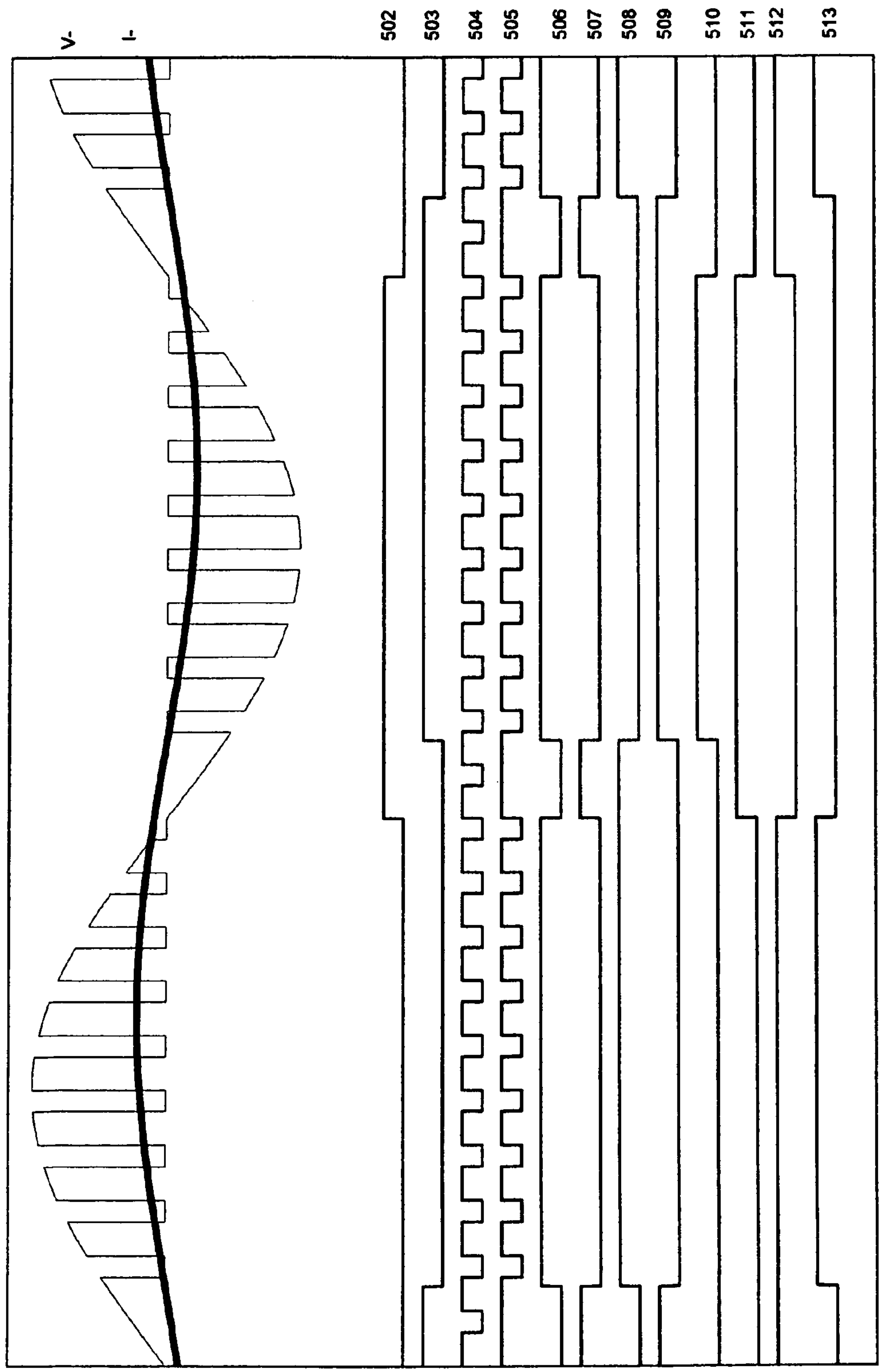

ENERGY SAVING ELECTRICAL POWER CONTROL DEVICE AND METHOD

FIELD OF THE INVENTION

This invention relates to energy saving electrical controllers. In particular, this invention relates to an energy saving power control device and method which reduces the power consumption of inductive-dissipative and inductive-resistive loads.

BACKGROUND OF THE INVENTION

Conservation and the intelligent use of energy resources are extremely important in today's society. In the case of electricity in particular, demands are constantly increasing and in many regions resources are strained. There have accordingly been many devices developed over the years to reduce electrical power consumption by electrical loads.

When used with inductive-dissipative loads such as ballasted gas discharge lamps or electric motors, the removal of a portion of each half cycle of the AC fundamental power can result in a significant decrease in the power factor. The power factor is the ratio of true power to apparent power, which can be expressed as:

$$\text{power factor} = \frac{\sum_{0}^{n} [V_n^* I_n^* \cos(\theta_n)]}{\sum_{0}^{n} [V_n^* I_n]}$$

where $V_n$=voltage of harmonic n $I_n$=current of harmonic n $\theta_n$=phase angle between the voltage and current in harmonic n n=harmonic number.

In purely resistive loads the voltage and current are always in phase, so power factor is not an issue. However, in inductive-dissipative and inductive-resistive loads (which includes circuits that behave like inductive loads such as ballasted fluorescent lighting and other gas discharge lamp systems), the line voltage and load current are almost invariably out of phase to some extent, so the power factor is typically less than one even where the supply power is uninterrupted. As the power factor decreases, the efficiency of inductive-dissipative and inductive-resistive loads also decreases. This is especially important to commercial and industrial electricity consumers because, apart from the negative effect of a poor power factor on power consumption, many utility companies charge a higher rate when the power factor falls below a specified level.

For example U.S. Pat. No. 5,455,491 issued Oct. 3, 1995 to Hajagos et al., which is incorporated herein by reference, describes an energy saving control circuit for use with ballasted fluorescent lights. The circuit comprises a power circuit connectable to an alternating circuit power supply, and a control circuit which includes means for timing the operation of a bi-directional switch in the power circuit, so that the switch supplies power to the load for a predetermined time during each half cycle of the power supply, and cuts off power to the load once during each half cycle. This circuit reduces power consumption, because the load does not consume power from the power supply during the interval of each half cycle in which power is cut off.

However, in Hajagos et al. the switching circuitry interrupts the supply power only once during each half cycle of the supply power frequency. Accordingly, although the switching circuitry can have a fairly large tolerance for timing and can thus be relatively basic, the effectiveness of the control circuitry is limited.

U.S. Pat. No. 4,350,935 issued Sep. 21, 1982 to Spira et al., which is incorporated herein by reference, also describes an energy saving control circuit for use with discharge lamps. Spira et al. operates in a manner very similar to Hajagos et al., but Spira et al. interrupts the supply power multiple times during each half cycle of the power supply. This is a more effective control circuit than that described by Hajagos et al., but gives rise to switching problems. It is in general extremely important to ensure that an inappropriate element of the switch which circulates the current back to the load during interrupt intervals is never on for any substantial length of time while the power supply is being supplied to the load, because the surge current will destroy the circuit components. Accordingly, the switching must be very carefully timed taking into account not only the durations of the power supply and interrupt intervals, but also the latency of the switching devices. This is a practical problem that renders the control circuit of Spira et al. difficult to implement as described.

It would accordingly be advantageous to provide a control circuit for an inductive-dissipative or inductive-resistive loads that allows for interrupting the supply power multiple times during each half cycle of the power supply without risking destruction of the circuit components when switching due to timing overlaps or switching latency characteristics.

SUMMARY OF THE INVENTION

The present invention provides an electrical load controller that reduces the power consumption of inductive-dissipative or inductive-resistive loads, including for example fluorescent lighting, and including purely resistive loads to which an inductor has been coupled, without any substantial reduction in the power factor. The method and device of the invention interrupts the AC power supply to the load during a plurality of intervals within each half cycle of the AC mains power frequency. In the case of inductive-dissipative or inductive-resistive loads, each interruption of the AC supply power will cause the load to generate a momentary voltage surge unless a path is created for the current, which is accordingly circulated to the load during the interrupt interval.

As in the prior art, the invention accomplishes this by providing a bi-directional power switch for controlling the voltage to the load, and a bi-directional current circulating switch that selectively turns on the appropriate element of the current circulating switch which circulates current through the load during voltage interrupt intervals. A control module is provided which comprises an oscillator operating at a frequency equal to a selected multiple of the AC mains power frequency, having a duty cycle control circuit which deactivates the power switch and additional circuitry which determines and activates the appropriate element of the current circulating switch substantially during the time when both the voltage and current in the load are of the same polarity.

According to the present invention switching is only effected during those portions of the AC mains power frequency where the instantaneous voltage and instantaneous current have the same polarity. The power switch may be left "on" in both directions during an interval encompassing the voltage and current crossover points, during which the voltage and current have opposite polarities, referred to herein as the "crossover lag zone." or alternatively the power switch may be switched at oscillator frequency with both elements of the current circulating switch switched in opposition to provide no substantial overlap of "on" time during the crossover lag zone.

At the same time, because, outside of the crossover lag zone, only the appropriate element of the current circulating switch remains open during supply power "on" intervals, there is no opportunity for a short circuit of the power supply through the current circulating switch. Additionally, transient voltages cannot be generated during transition from "on" to "off" of the power switch as the circulating current switch is already available to allow circulating current flow.

Within the crossover lag zone, the levels of voltage and current are so low that cross-conduction currents and/or transient surge voltages are not ordinarily substantial enough to affect the switching circuit components.

At the same time switching the power switch "on" and having the appropriate circulating switch element "on" outside the crossover lag zone allows for seamless transitions, which are completely latency-independent, to the "off" state when the power switch is shut off, which thus considerably simplifies the timing circuitry for the switch drivers.

It will be appreciated that the conditions of the power supply and appropriate element of the current circulating switches "on" can extend slightly into the crossover lag zone, and the invention will operate in the same fashion.

As long as the starting and ending points for the concurrent "on" conditions of the power supply and appropriate element of the current circulating switches are both selected to be within positions of the voltage and current waveforms where the voltage and current levels are sufficiently low that cross-conduction currents and transient surge voltages are not substantial enough to affect the switching circuit components, the invention will operate as described to reduce power consumption by the load.

Further, the device of the invention dynamically reacts to changes in the load (e.g. as lights are turned on or off) and automatically adjusts to the new power factor.

The present invention thus provides a power control device for connection to AC mains electric power supply having a power supply frequency and an AC load, comprising: a bi-directional electric power switch capable of being switched at a switching frequency that is a multiple of the power supply frequency, connected in series between the AC mains power supply and the load and comprising two switching elements connected in series and oriented in opposite polarities, each switching element having an "off" condition in which the switching element substantially blocks a flow of current in one direction, a bi-directional electric circulating switch capable of being switched at the switching frequency, for parallel connection to the load, comprising two switching elements connected in series and oriented in opposite polarities, each switching element having an "off" condition in which the switching element substantially blocks a flow of current in one direction; and a control module for controlling the switches, comprising an oscillator running at the switching frequency, a duty cycle control circuit controlling the oscillator, the duty cycle controlled by a reference signal and having a high portion and a low portion, a power switch driver coordinated to turn one element of the power switch "on" during one of the high and low portions of the duty cycle and to turn the one element of the power switch "off" during the other of the high and low portions of the duty cycle, and a circulating switch driver coordinated to turn one element of the circulating switch "off" when the power switch is turned "on" and to turn the one element of the circulating switch "on" when the power switch is turned "off", and during a crossover lag interval encompassing zero crossing points of the voltage and current and during which the voltage and current have opposite polarities, both elements of the power switch being switched to the "on" condition, one element of the circulating switch being switched to the "on" condition when a positive current is flowing in the load and the other element of the circulating switch being switched to the "on" condition when a negative current is flowing in the load, whereby the circulating switch is operative to supply a circulating current to the load during intervals when the mains power supply to the load is interrupted.

In further aspects of the power control device of the invention: the power switch comprises two field effect transistors with built-in anti-parallel diodes arranged in opposition series connection; the circulating switch comprises two field effect transistors with built-in anti-parallel diodes arranged in opposition series connection; the oscillator runs at a fixed frequency; the duty cycle control circuit has an adjustable duty cycle; the duty cycle is controlled by an external signal; the external signal is provided by the voltage from a potentiometer; the power switch driver or the circulating switch driver is coordinated to provide a delay between the "off" condition of one switch and the "on" condition of the other switch; the low portion of the duty cycle is adjustable in length and in its position within the AC mains electric power supply; the high portion of the duty cycle is adjustable in length and in its position within the AC mains electric power supply; the oscillator is synchronized to the power supply frequency; the switches comprise bi-polar transistors with anti-parallel diodes; and/or the switches comprise insulated gate bi-polar transistors with anti-parallel diodes.

The present invention further provides a method of controlling a supply of power from an AC mains electric power supply having a power supply frequency to an AC load, comprising the steps of: a. generating a duty cycle having high and low portions at a switching frequency that is a multiple of the power supply frequency, b. in one portion of the duty cycle, interrupting a supply of power from the mains power supply to the load and connecting a circulating circuit to the load, wherein the circulating circuit recycles to the load an electric current generated by the interruption of power to the load, c. in the other portion of the duty cycle, restoring the supply of power from the mains power supply to the load and disconnecting the circulating circuit from the load, and d. during a crossover lag interval encompassing zero crossing points of the voltage and current and during which the voltage and current have opposite polarities, switching both elements of the power switch to the "on" condition, and switching one element of the circulating switch to the "on" condition when a positive current is flowing in the load and switching the other element of the circulating switch to the "on" condition when a negative current is flowing in the load, whereby the circulating switch is operative to supply a circulating current to the load during intervals when the mains power supply to the load is interrupted.

In further aspects of the method of the invention: the duty cycle has a fixed frequency; the duty cycle is adjustable; the method includes the sub-step of controlling the duty cycle using an external signal; there is a delay between the "off"

condition of one switch and the "on" condition of the other switch; the low portion of the duty cycle is adjustable in length and in its position within the AC mains electric power supply; the high portion of the duty cycle is adjustable in length and in its position within the AC mains electric power supply; and/or the duty cycle is synchronized to the power supply frequency.

BRIEF DESCRIPTION OF THE DRAWINGS

In drawings which illustrate by way of example only a preferred embodiment of the invention, FIG. 1 is a graph illustrating voltage and current waveforms of a typical 60 Hz alternating current (AC) mains supply power to an inductive-dissipative or inductive-resistive load, having a power factor of less than one.

FIG. 2B is a graph illustrating an interrupt interval within the waveform of the 60 Hz AC power of FIG. 2A.

FIG. 4B is a graph illustrating the waveforms produced at different points in a circuit embodying the present invention.

DETAILED DESCRIPTION OF THE INVENTION

A preferred embodiment of the invention will be described in the context of a power control device for controlling the electrical power supplied to ballasted fluorescent lights, which behave like an inductive-dissipative load in an electric circuit. It will be appreciated that the invention can be applied equally to other inductive and inductor-like loads, including electric motors, compressors, variable speed drives and the like. The invention can also be used with resistive loads, however the invention is most advantageously used with inductive and inductor-like loads.

FIG. 1 illustrates the voltage waveform of a typical 60 Hz alternating current mains power supply. Within each cycle is a positive half cycle and a negative half cycle, respectively defined between sequential zero crossing points. According to the invention, the AC mains power supply is interrupted during a plurality of intervals 6 within each half cycle.

Figure 2A:
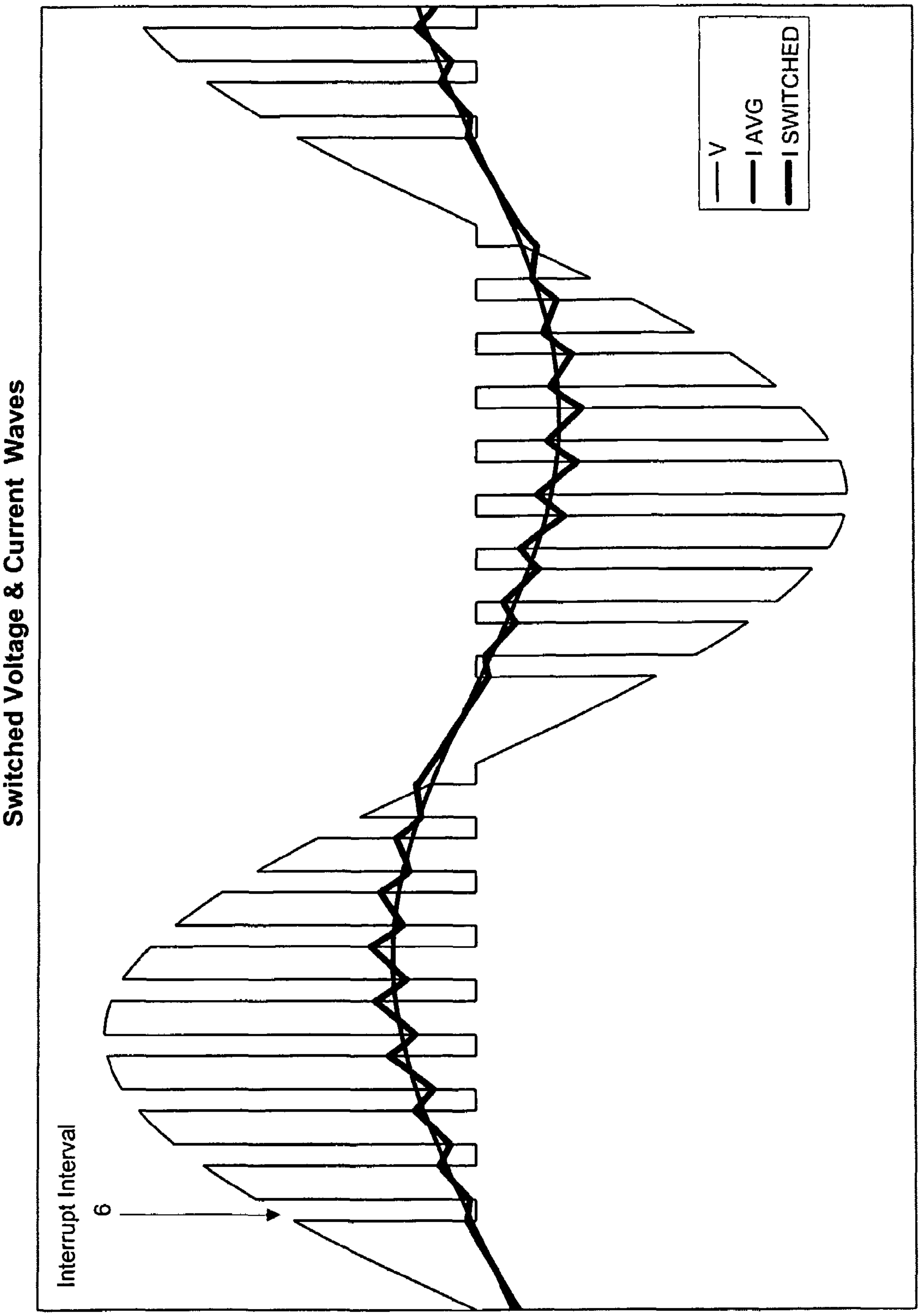
FIG. 2A is a graph illustrating the waveform of the 60 Hz AC power at the output of the power circuit of the present invention.
Figure 3:
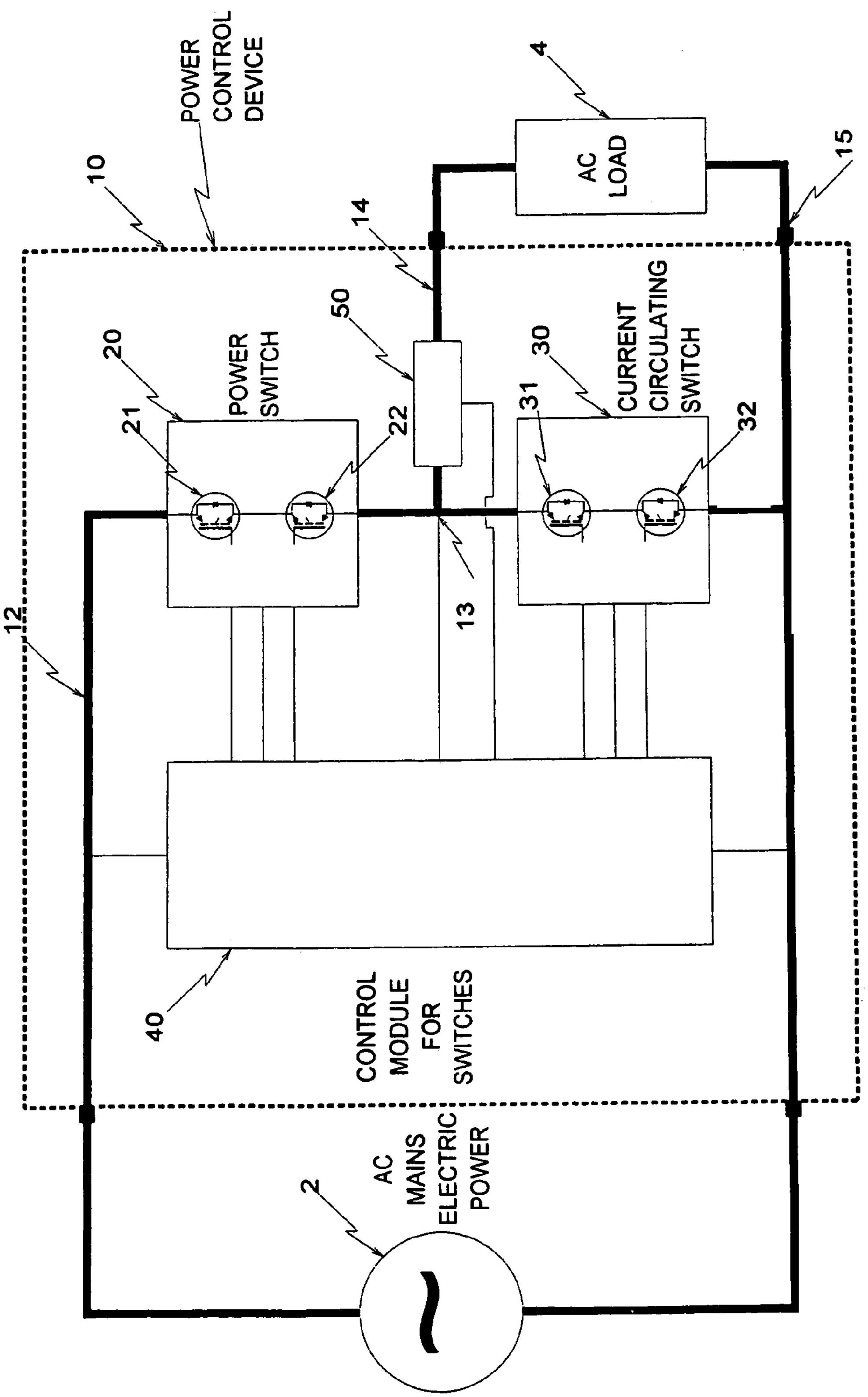
FIG. 3 is a circuit diagram illustrating a preferred embodiment of the invention.

One example of a modified power supply produced by the invention is illustrated in FIGS. 2A and 2B. This power waveform is produced by the preferred embodiment of the power control device 10 of the invention illustrated in FIG. 3, which comprises a power supply circuit 12 coupled to an AC electrical mains power supply 2, and a load current circuit 14 coupled to an AC load 4. The AC load 4 may be any type of load capable of being powered by an alternating current, but the invention works most advantageously with inductive-dissipative loads or inductive resistive loads such as ballasted fluorescent lighting.

A power switch 20 is interposed into the power circuit 12 in series. In the preferred embodiment the power switch 20 comprises a bi-directional power switch having a latency that is substantially smaller than the frequency of the AC mains power supply. For example, the power switch 20 may comprise a pair of -insulated gate bipolar transistors (IGBT's) 21, 22 with integrated anti-parallel diodes, arranged in an opposing series connection. Alternatively, the IGBT's may be used with independent diodes (not shown). The first side of power switch 20 is connected to the first side of power supply 2 via conductor 12. The second side of power switch 20 is connected via junction 13 through current sensor 50 via conductor 14 to the first side of the load 4. The second side of the power supply 2 circuit is connected directly via conductor 15 to the second side of the load 4.

The circulating current switch 30 is similarly a bi-directional power switch having a latency substantially shorter than the frequency of the AC mains power supply, and similarly preferably comprises a pair of IGBTs 31, 32 with integrated anti-parallel diodes arranged in opposing series connection. The first side of the circulating switch 30 is connected via junction 13 through current sensor 50 via conductor 14 to the first side of the load 4. The second side of the circulating switch 30 is connected to the second side of the load 4 via conductor 15.

Figure 4A:
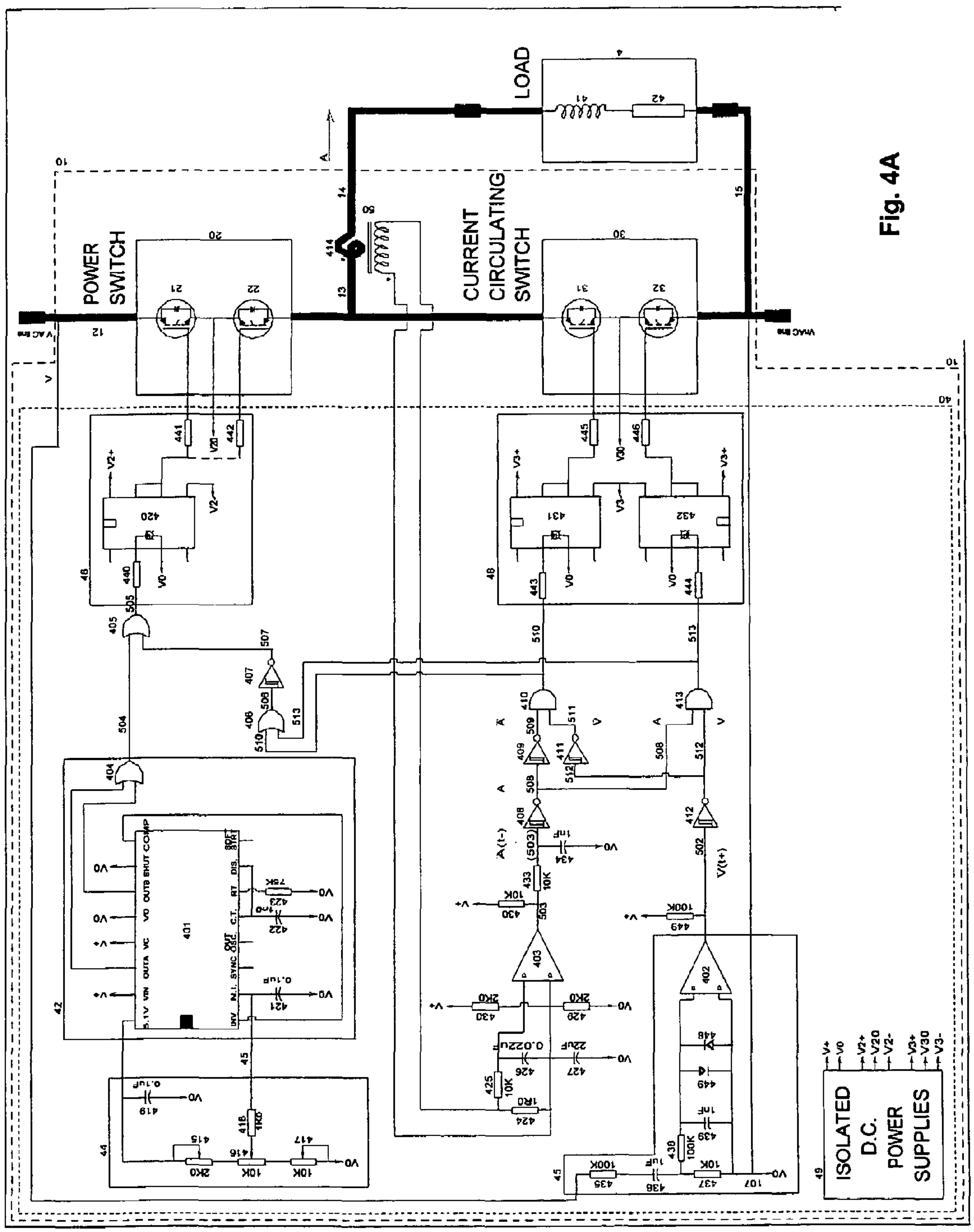
FIG. 4A is a schematic diagram illustrating the control module for controlling the switches in FIG. 3.

The power control device 40, one preferred embodiment of which is illustrated in FIG. 4A, comprises an oscillator 42 having a pulse width controllable duty cycle, for example a pulse width modulator control Motorola SG3525 401 coupled to an OR gate 404 ¼ of Motorola MC14071B, operating at a selected frequency that is a multiple (although not necessarily an integer multiple) of the AC power supply frequency; a duty cycle control circuit 44 provides a reference signal 45, for example the voltage from a potentiometer 416; a power switch driver 46 for activating and deactivating the power switch 20; and a circulating switch driver 48 for activating and deactivating the appropriate element of circulating switch 30. The power switch driver 46 and circulating switch driver 48 operate in opposition, such that whenever the power switch 20 is switched "on" the appropriate element of circulating switch 30 is switched "off", and vice versa. The appropriate element of circulating switch 30 is IGBT 32 when positive current (flow from 13 to 14) is flowing in the load, and IGBT 31 when negative current (flow from 14 to 13) is flowing in the load. In the preferred embodiment an oscillator operates at a frequency equal to a 350 times multiple of the AC mains power frequency.

The reference signal 45 can have a fixed value or can be dynamically variable, for example by generating a very high frequency signal which is then divided using a limited pseudo-random divider connected to a frequency to voltage converter to provide a dithering reference about a fixed point in turn causing a dithering variable duty cycle about a fixed point, which can be advantageous in reducing "hum." The reference signal 45 can also be the resultant of a feedback system which would be enabled by measuring the load voltage and comparing it to a set point in an operational amplifier to generate the signal for 45.

There is no substantial overlap between the "on" conditions of the power switch 20 and the inappropriate element of circulating switch 30, as this would short circuit the power supply 2 through the circulating switch 30. In one preferred embodiment there is also no substantial overlap between the "off" conditions of the power switch 20 and the circulating switch 30, to the extent that this would result in a disruptive interruption of power to the load 4, however there may be embodiments in which it is advantageous to provide a slight delay between the "off" condition of one switch 20 or 30 and the "on" condition of the other switch 30 or 20. In the preferred embodiment both the high and low portions of the duty cycle are adjustable in length and in their position (phase) of the AC mains electric power supply.

The invention operates to mollify the effect whereby when a circuit containing an inductor with current flowing in it is opened, the inductor generates whatever voltage is required to maintain the flow of electric current. Thus, the sudden deactivation of the power supply can cause the inductor to generate a large surge voltage particularly during that portion of the cycle when maximum instantaneous load current is flowing unless an alternate path is provided for the current. Through appropriate synchronization of the power switch 20 and circulating switch 30, the current can be recycled to the load 4, to power the load 4 during the momentary intervals 6 in which the AC power supply has been cut off. Accordingly, the resulting waveform of the voltage at the load 4, shown in FIG. 2B, closely resembles the uninterrupted power supply waveform of FIG. 1, the interruption intervals 6 in the waveform of FIG. 2A being supplemented by the circulating current generated by the inductive or inductor-like load with each interruption of the mains power supply 2.

Synchronization of the power switch 20 and circulating switch 30 can be difficult. According to the preferred embodiment of the invention, switching is effected during those portions of the AC mains power cycle in which the instantaneous voltage and instantaneous current have the same polarity. The power switch 20 is thus switched to the "on" condition, in both directions (i.e. both IGBT's 21, 22 are switched on), during the interval that encompasses both the voltage crossover point and the current crossover point (referred to herein as the "crossover lag zone"), during which the voltage and current have opposite polarities. Alternatively, the power switch 20 may be switched at the oscillator frequency with opposing sides of the current circulating switch 30 being switched in opposition, so that there is no substantial overlap of "on" time between the two current circulating IGBT's 31, 32 within the crossover lag zone. Outside of the crossover lag zone, only the appropriate side of the current circulating switch 30 remains open to conduction during supply power "on" intervals, so there is no opportunity for a short circuit of the power supply through the current circulating switch 30. Additionally, transient voltages cannot be generated during the power switch 20 transition from "on" to "off," as the appropriate element of circulating current switch 30 is already on to allow the current to continue to circulate through the load.

This considerably simplifies the timing circuitry for the switch drivers 46, 48. Within the crossover lag zone, the levels of voltage and current are so low that cross-conduction currents and/or transient surge voltages are not ordinarily substantial enough to affect the switching circuit components, so this switching method poses little risk of damaging the circuit components. At the same time switching the power switch 20 "on" and having the appropriate circulating switch 31 or 32 "on" outside the crossover lag zone allows for seamless transitions, which are completely latency-independent, to the "off" state when the power switch 20 is shut off.

The switching of the power switch 20 to the "on" condition in advance of the crossover lag zone can be accomplished by coupling a small capacitive reactance 436 in a voltage crossover sensing circuit 45, as shown in FIG. 4A. The voltage in the crossover anticipator circuit 45 leads the applied voltage by an amount determined by the reactance, so the switch drivers 46, 48 can be timed to switch the switches 20, 30 to the appropriate state at the zero crossing point. A current sensor 50 in the load circuit 13/14 detects the current zero crossing point for the end of the crossover lag zone. The current sensor 50 is shown in FIG. 4A as a current transformer, however it will be appreciated that the current sensor 50 could be a current transducer or any other functionally similar device, and can be positioned anywhere within the load circuit.

The logic of the circuit of FIG. 4A is more completely described as follows: The output 504 of oscillator 42 is a square wave between zero and high of approximately 20,000 cycles per second with a duty cycle variable (for example between 100% to 50%). This signal is fed via OR 405 and high-speed optoisolator 420 (e.g. Toshiba TLP 250) to drive power switch 20 accordingly.

This forms a base line drive to power switch 20 and is always running the switch. The output 512 of inverter 412 is a square wave with its positive portion slightly leading the positive portion of the sine wave of the mains supply voltage and the zero portion slightly leading the negative portion of the sine wave of the mains supply voltage. Similarly the output 508 of inverter 408 is a square wave with its positive portion slightly lagging the positive portion of the current to the load and the zero portion slightly lagging the negative portion of the current to the load. These two signals are combined by AND 413 to provide a positive value at 513. This positive at 513 drives IGBT32 "on" via optoisolator 432 essentially during that portion of the load power when both instantaneous voltage and current are positive.

Similarly, 508 and 512 are inverted by inverters 409 & 411 respectively and then combined by AND 410 to provide a positive value at 510. This positive 510 drives IGB31 "on" via optoisolator 431 essentially during that portion of the load power when both instantaneous voltage and current are negative.

The values at 510 and 513 are combined at OR 406 then inverted by 407 to provide a signal at 507 that is high essentially during the portions of the power wave to the load when the polarities of the instantaneous values of the current and voltage are opposite. This then overrides the baseline drive to the power switch 20 and turns switch 20 on continuously during the times when polarities of the instantaneous values of the current and voltage are opposite.

This then means switch drivers 46, 48 are responding to cause the switch elements 21, 22 and 31, 32 of the respective switches 20, 30 to be switched to the appropriate state.

It will be appreciated that the "on" conditions of the power switch 20 and the appropriate side 31 or 32 of the current circulating switch 30 can extend slightly into the crossover lag zone, and the invention will operate in the same fashion. The invention will operate as described to reduce power consumption by the load as long as the starting and ending points for the concurrent "on" conditions of the power switch 20 and appropriate side 31 or 32 of the current circulating switch 30 are both selected to be within positions of the voltage and current waveforms where the voltage and current levels are sufficiently low that cross-conduction currents and transient surge voltages are not substantial enough to affect the switching circuit components.

As long as the switching of the power switch 20 and the circulating switch 30 occurs substantially simultaneously, it is immaterial whether the power supply circuit 12 is interrupted on the high side or on the low side of the duty cycle. In an embodiment wherein the power switch 20 and circulating switch 30 are switched on and off, respectively, on the high side of the duty cycle; and are switched off and on, respectively, on the low side of the duty cycle; the invention operates as follows:

When the AC power supplied to the load 4 is first activated, the AC mains power supply 2 transmits AC power to the control module 40 and, through the power switch 20, to the load 4, at a fixed frequency. A reference voltage, which may be derived from the AC power supply (in which case the reference voltage would have a fixed frequency), or which may alternatively be provided by an external source (at either a fixed or a variable frequency), drives the oscillator 42, which defines the duration of the high and low intervals of the duty cycle. The reference voltage may be in the form of an analog signal or a digital stream, the only limitation being that the frequency of the duty cycle must be higher than, and is preferably substantially higher than, the frequency of the AC mains power supply.

In the embodiment shown the oscillator 42 is operative to turn on the power switch 20 on the high side of the duty cycle. The phase of the oscillator 42 may be (but is not necessarily) synchronized to the zero crossing point of the AC supply power.

At the first interrupt interval 6, the oscillator 42 (502) goes low. The power switch driver 46 switches IGBT's 21, 22 "off", and the circulating switch driver 48 has already switched IGBT 32 "on" (because the voltage and current are both positive at this point in the AC power cycle). The sudden loss of supply power to the load 4 causes the electromagnetic field surrounding the load 4 to collapse, continuing the current in the conductor 14 or 15. With the circulating switch 30 "on", the current circulates around the conductors 14 and 15 for the duration of the low portion of the duty cycle.

The current circulating through the current circulating switch 30 thus powers the load 4 for the duration of the low (interrupt) portion of the oscillator duty cycle. At the end of the low portion of the duty cycle, the duty cycle control circuit 42 goes high. In response the power switch driver 46 switches IGBT's 21, 22 back "on", replacing the circulating current and resuming the normal power supply to the load 4 from the mains power supply 2.

This cycle repeats until the zero crossing point of the voltage in the voltage crossover anticipator circuit 45, at which point both sides 21, 22 of power switch 20 are switched "on" for the duration of the crossover lag zone. IGBT 32 of the current circulating switch 30 is switched "on" (IGBT 31 remains off) during the interval in which the voltage and current are both positive, and IGBT 31 of the current circulating switch 30 is switched "on" (IGBT 32 remains off) during the interval in which the voltage and current are both negative. In this fashion, no transient voltage is generated and, because only the appropriate side 31 or 32 of the current circulating switch 30 is turned "on" during each crossover lag zone, there is no possibility of either current cross-conduction (short circuiting the power supply through switches 20 and 30) or generating destructive voltage transients by not having the current circulating switch immediately available to conduct the load current during "off" condition of the power switch 20.

The isolated DC power supplies 49 in the preferred embodiment comprise:

| | | | |
|---|---|---|---|
| Supply 1 V0 to V+ | 12 VDC | 50 mA continuous | 100 mA surge |
| Supply 2 V20 to V2+ | 15 VDC | 2 mA continuous | 100 uCoulomb surge |
| Supply 2 V2− to V20 | 5 VDC | 2 mA continuous | 100 uCoulomb surge |
| Supply 3 V30 to V3+ | 15 VDC | 2 mA continuous | 100 uCoulomb surge |
| Supply 2 V3− to V30 | 5 VDC | 2 mA continuous | 100 uCoulomb surge |

As illustrated in FIG. 2A, the duty cycle repeats a plurality of times during each half cycle of the AC power supply. Thus, from the perspective of the load 4, the power supply is constant—in the high portion of the duty cycle the load 4 is powered by the AC supply power via power supply circuit 12; in the low portion of the duty cycle the load 4 is powered by the current via current circulating switch 30. The resulting power consumption waveform is a rough approximation of the original sinusoidal waveform of the AC supply power, as shown in FIG. 2B.

In preferred variations of the invention, the mains supply power is interrupted a plurality of times during each half cycle of the mains power supply, the differences being in the position and duration of the power interruption intervals.

The device of the invention has been described in terms of circuit components capable of providing the desired functionality. It will be apparent to those skilled in the art that the functionality could instead be programmed into a microcontroller which would operate in the same fashion, without using many of the discrete circuit components shown.

The device of the invention has been described, for simplicity, in terms of a single-phase circuit. It will be apparent to those skilled in the art that, with the addition of relevant circuit devices, the invention is equally applicable to poly-phase circuits.

It will be appreciated that many other variations, both synchronous and asynchronous, are available according to the invention, and with suitable timing between the on and off positions of the elements of power switch 20 and elements of the circulating switch 30, the result is the same. It will also be appreciated that where it is indicated that there should be no substantial overlap between the "on" conditions of the power switch 20 and circulating switch 30, a very slight overlap would be tolerable, but in general undesirable.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A power control device for connection to AC mains electric power supply having a power supply frequency and an AC load, comprising:

a bi-directional electric power switch capable of being switched at a switching frequency that is a multiple of the power supply frequency, connected in series between the AC mains power supply and the load and comprising two switching elements connected in series and oriented in opposite polarities, each switching element having an "off" condition in which the switching element substantially blocks a flow of current in one direction, a bi-directional electric circulating switch capable of being switched at the switching frequency, for parallel connection to the load, comprising two switching elements connected in series and oriented in opposite polarities, each switching element having an "off" condition in which the switching element substantially blocks a flow of current in one direction; and a control module for controlling the switches, comprising an oscillator running at the switching frequency, a duty cycle control circuit controlling the oscillator, the duty cycle controlled by a reference signal and having a high portion and a low portion, a power switch driver coordinated to turn at least one element of the power switch "on" during one of the high and low portions of the duty cycle and to turn the elements of the power switch "off" during the other of the high and low portions of the duty cycle, and a circulating switch driver coordinated to turn one element of the circulating switch to the "on" condition when a positive current is flowing in the load and the other element of the circulating switch to the "on" condition when a negative current is flowing in the load, and during a crossover lag zone encompassing zero crossing points of the voltage and current and during which the voltage and current have opposite polarities, both elements of the power switch being switched to the "on" condition, whereby the circulating switch is operative to supply a circulating current to the load during intervals when the mains power supply to the load is interrupted.

2. The power control device of claim 1 wherein the power switch comprises two field effect transistors with built-in anti-parallel diodes arranged in opposition series connection.

3. The power control device of claim 2 wherein the circulating switch comprises two field effect transistors with built-in anti-parallel diodes arranged in opposition series connection.

4. The power control device of claim 1 wherein the oscillator runs at a fixed frequency.

5. The power control device of claim 1 wherein the duty cycle control circuit has an adjustable duty cycle.

6. The power control device of claim 1 wherein the duty cycle is controlled by an external signal.

7. The power control device of claim 6 wherein the external signal is provided by the voltage from a potentiometer.

8. The power control device of claim 1 wherein the power switch driver or the circulating switch driver is coordinated to provide a delay between the "off" condition of one switch and the "on" condition of the other switch.

9. The power control device of claim 1 wherein the low portion of the duty cycle is adjustable in length and in its position within the AC mains electric power supply.

10. The power control device of claim 1 wherein the high portion of the duty cycle is adjustable in length and in its position within the AC mains electric power supply.

11. The power control device of claim 1 wherein the oscillator is synchronized to the power supply frequency.

12. The power control device of claim 1 wherein the switches comprise bi-polar transistors with anti-parallel diodes.

13. The power control device of claim 1 wherein the switches comprise insulated gate bi-polar transistors with anti-parallel diodes.

14. A method of controlling a supply of power from an AC mains electric power supply having a power supply frequency to an AC load, comprising the steps of:

a. generating a duty cycle having high and low portions at a switching frequency that is a multiple of the power supply frequency, b. in one portion of the duty cycle, interrupting a supply of power from the mains power supply to the load and connecting a circulating circuit to the load, wherein the circulating circuit recycles to the load an electric current generated by the interruption of power to the load, c. in the other portion of the duty cycle, restoring the supply of power from the mains power supply to the load, and d. during a crossover lag zone encompassing zero crossing points of the voltage and current and during which the voltage and current have opposite polarities, switching both elements of the power switch to the "on" condition, and switching one element of the circulating switch to the "on" condition when a positive current is flowing in the load and switching the other element of the circulating switch to the "on" condition when a negative current is flowing in the load, whereby the circulating switch is operative to supply a circulating current to the load during intervals when the mains power supply to the load is interrupted.

15. The method of claim 14 wherein the duty cycle has a fixed frequency.

16. The method of claim 14 wherein the duty cycle is adjustable.

17. The method of claim 14 wherein including the substep of controlling the duty cycle using an external signal.

18. The method of claim 14 wherein there is a delay between the "off" condition of one switch and the "on" condition of the other switch.

19. The method of claim 14 wherein the low portion of the duty cycle is adjustable in length and in its position within the AC mains electric power supply.

20. The method of claim 14 wherein the high portion of the duty cycle is adjustable in length and in its position within the AC mains electric power supply.

21. The method of claim 14 wherein the duty cycle is synchronized to the power supply frequency.

* * * * *